(12) United States Patent
Shebanow et al.

(10) Patent No.: US 8,127,181 B1
(45) Date of Patent: Feb. 28, 2012

(54) HARDWARE WARNING PROTOCOL FOR PROCESSING UNITS

(75) Inventors: Michael C. Shebanow, Saratoga, CA (US); John S. Montrym, Los Altos Hills, CA (US); Richard A. Silkebakken, Santa Clara, CA (US); Robert C. Keller, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 345 days.

(21) Appl. No.: 11/934,732

(22) Filed: Nov. 2, 2007

(51) Int. Cl.
*G06F 11/00* (2006.01)
*G06F 11/36* (2006.01)

(52) U.S. Cl. .......... 714/38.13; 714/35; 714/49; 717/126

(58) Field of Classification Search .................... 714/35, 714/38.1, 38.13, 48, 49, 57, 10, 47.2; 717/126
See application file for complete search history.

(56) References Cited

U.S. PATENT DOCUMENTS

| | | | | |
|---|---|---|---|---|
| 4,554,661 | A * | 11/1985 | Bannister | 714/45 |
| 5,583,988 | A * | 12/1996 | Crank et al. | 714/48 |
| 5,862,316 | A * | 1/1999 | Hagersten et al. | 714/15 |
| 5,905,892 | A * | 5/1999 | Nielsen et al. | 717/145 |
| 6,149,318 | A * | 11/2000 | Chase et al. | 717/131 |
| 7,340,726 | B1 * | 3/2008 | Chelf et al. | 717/126 |
| 7,426,657 | B2 * | 9/2008 | Zorek et al. | 714/13 |
| 7,712,084 | B2 * | 5/2010 | Beuten et al. | 717/129 |
| 7,844,861 | B2 * | 11/2010 | Hegarty et al. | 714/46 |
| 2004/0078732 | A1 * | 4/2004 | Meaney | 714/57 |
| 2004/0139374 | A1 * | 7/2004 | Meaney et al. | 714/48 |
| 2006/0174170 | A1 * | 8/2006 | Garland et al. | 714/57 |

OTHER PUBLICATIONS

Wikipedia's Front and Back Ends retrieved Mar. 25, 2011 http://en.wikipedia.org/wiki/Front_and_back_ends.*
Eggers, et al. "Simultaneous Multithreading: A Platform for Next-Generation Processors," *IEEE Micro*, vol. 17, No. 5, pp. 12-19, Sep./Oct. 1997.

\* cited by examiner

*Primary Examiner* — Joseph Schell
(74) *Attorney, Agent, or Firm* — Patterson & Sheridan, LLP

(57) ABSTRACT

Processing units are configured to capture the unit state in unit level error status registers when a runtime error event is detected in order to facilitate debugging of runtime errors. The reporting of warnings may be disabled or enabled to selectively monitor each processing unit. Warnings for each processing unit are propagated to an exception register in a front end monitoring unit. The warnings are then aggregated and propagated to an interrupt register in a front end monitoring unit in order to selectively generate an interrupt and facilitate debugging. A debugging application may be used to query the interrupt, exception, and unit level error status registers to determine the cause of the error. A default error handling behavior that overrides error conditions may be used in conjunction with the hardware warning protocol to allow the processing units to continue operating and facilitate in the debug of runtime errors.

20 Claims, 8 Drawing Sheets

HARDWARE WARNING PROTOCOL FOR PROCESSING UNITS

BACKGROUND OF THE INVENTION

1. Field of the Invention

Embodiments of the present invention relate generally to a protocol for communicating errors in a computing system and, more particularly, to indicating programming errors in a processing unit when a program is run.

2. Description of the Related Art

Current graphics program compilers detect illegal instructions in programs to enable program debugging. However, some errors cannot be detected or prevented by graphics program compilers, such as single bit errors in random access memories (RAMs). More recently, graphics devices are configured to detect runtime errors, such as illegal operands that are not caught by the compiler and override the programmed state that causes an error using a default state to continue processing in a repeatable and predictable manner. This default error handling behavior can complicate debugging of the runtime errors since the device continues processing and information needed to debug the error is unavailable.

Accordingly, what is needed in the art is a system and method for improving the ability to debug runtime errors while allowing for the default error handling behavior.

SUMMARY OF THE INVENTION

Processing units are configured to capture the unit state in unit level error status registers when a runtime error event is detected in order to facilitate debugging of runtime errors. The reporting of the error events as warnings may be disabled or enabled to selectively monitor each processing unit. Warnings for each processing unit are propagated to a front end monitoring unit and then logged in an exception register in the front end monitoring unit. The warnings are then aggregated and propagated to an interrupt register in order to selectively generate an interrupt and facilitate debugging. A debugging application may be used to query the interrupt, exception, and unit level error status registers to determine the cause of the error. The default error handling behavior that overrides error conditions may be used in conjunction with the hardware warning protocol to allow the processing units to continue operating following a runtime error event.

Various embodiments of a method of the invention for indicating warnings for a processing unit within a system include receiving an error event signal indicating that a programming error has been detected by the processing unit and then capturing error state information of the processing unit in an error status register. The capturing is triggered by the error event signal. An error bit in the error status register that indicates an error event has occurred, and an exception bit in an exception register of a front end monitoring unit are updated to indicate a hardware warning that signals that the error event has been detected by the processing unit.

Various embodiments of the invention for a computing device configured to execute programs include a front end monitoring unit that is coupled to a processing unit. The front end monitoring unit includes an interrupt register and an exception register. The processing unit is configured to receive an error event signal indicating that a programming error has been detected and capture error state information of the processing unit in an error status register. The capturing is triggered by the error event signal. The processing unit updates an error bit in the error status register that indicates an error event has occurred and updates an exception bit in the exception register of the front end monitoring unit to indicate a hardware warning that the error event has been detected by the processing unit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
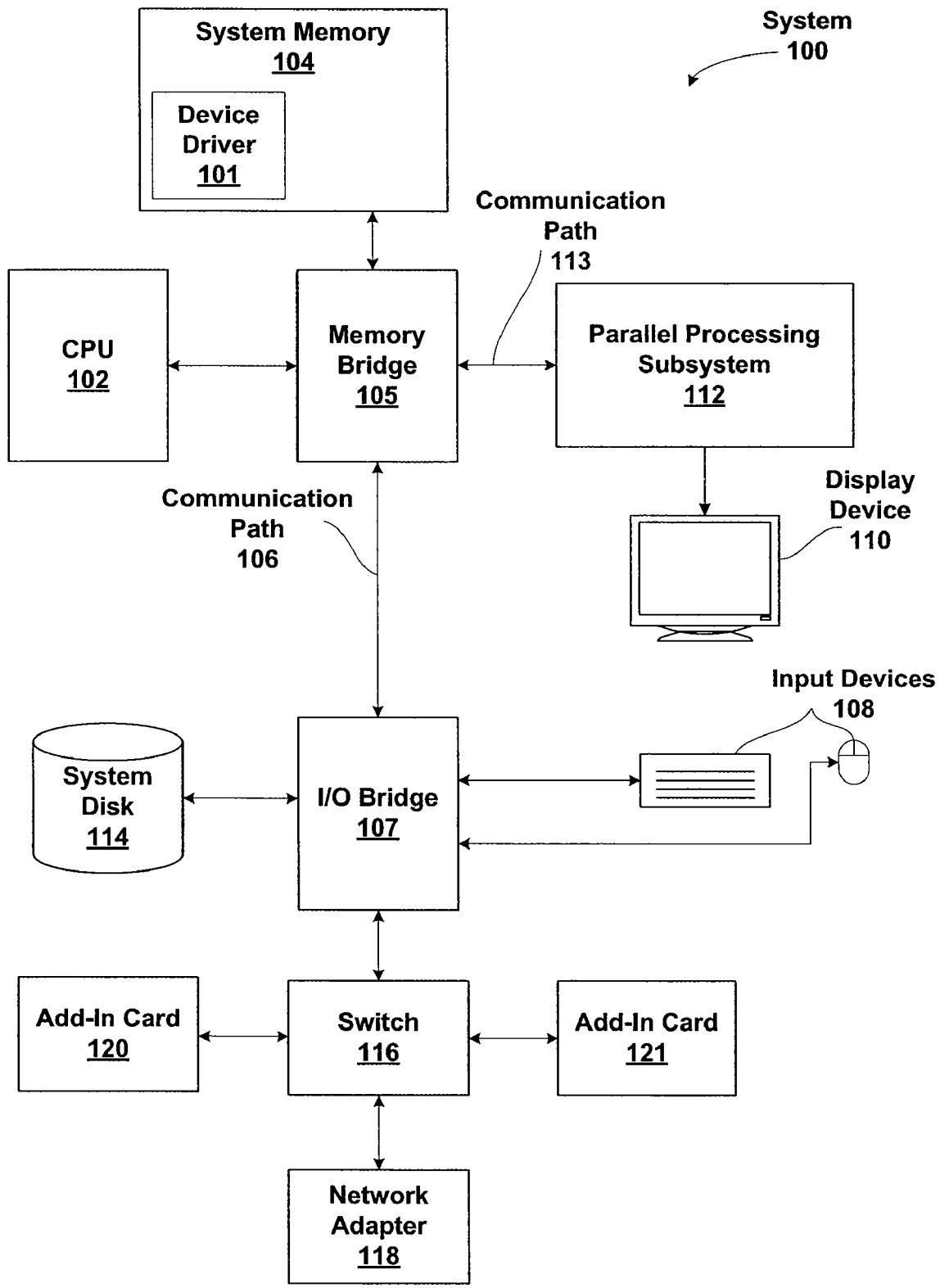
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. System memory 104 includes a device driver 101 that is configured to provide a software structure, referred to as a pushbuffer, that specifies the location of data and program instructions to parallel processing subsystem 112. The data and program instructions may be stored in system memory 104 or memory within other devices of system 100. Device driver 101 is executed by CPU 102 to translate instructions for execution by parallel processing subsystem 112 based on the specific capabilities of parallel processing subsystem 112. The instructions may be specified by an application programming interface (API) which may be a conventional graphics API such as Direct3D or OpenGL.

Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
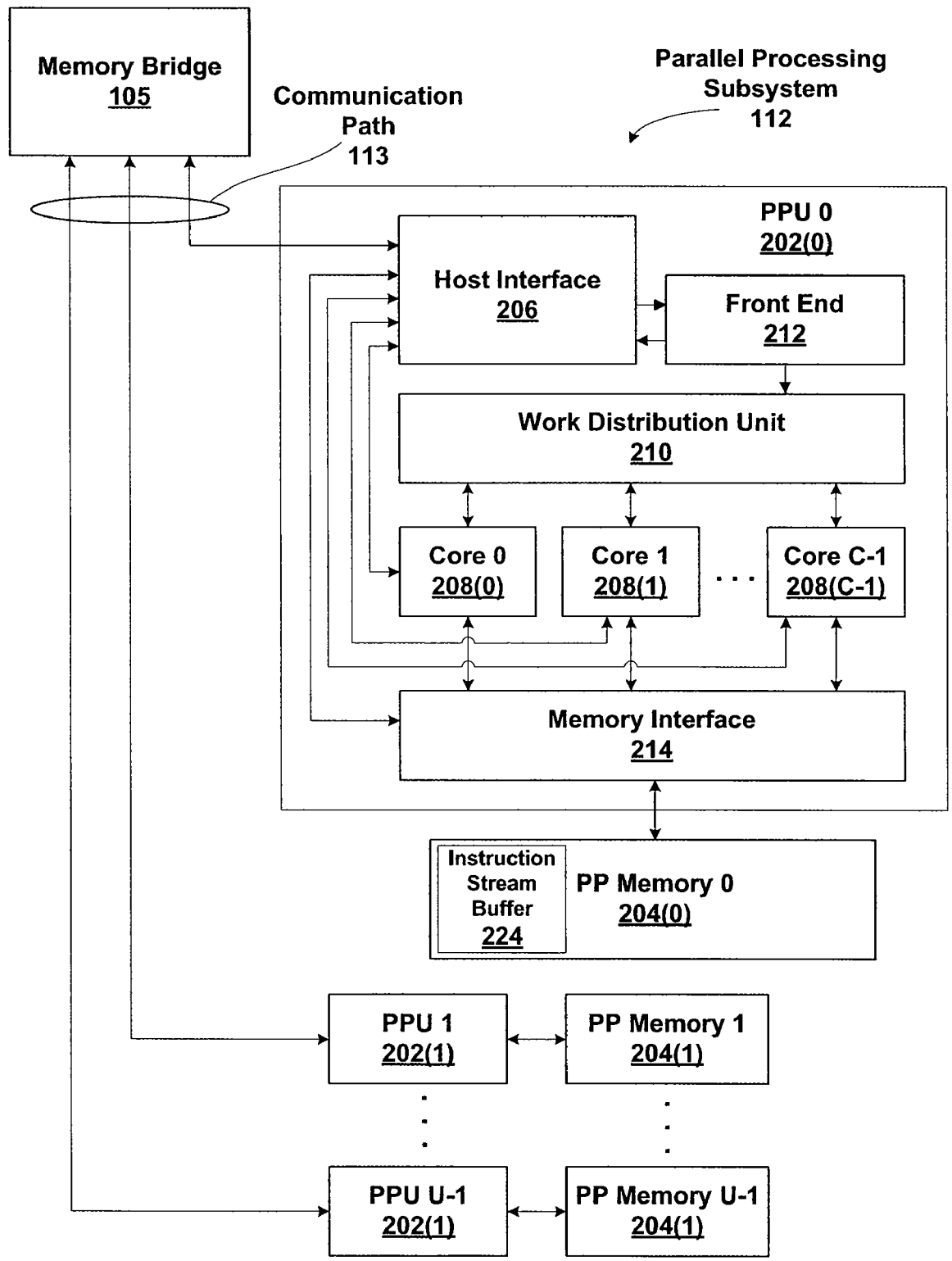
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. A pushbuffer, shown as instruction stream buffer 224 that specifies the location of data and program instructions for execution by each PPU 202 may be stored in each PP memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206 may be of generally conventional design, and a detailed description is omitted as not being critical to the present invention. Host interface 206 receives interrupt signals from front end 212 and outputs an interrupt reset to front end 212 to clear the interrupt, as explained further herein. Host interface 206 may also read an interrupt register and an exception register in front end 212 in addition to unit level error status reporting registers within cores 208.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens, hundreds, or thousands) of threads concurrently, where each thread is an instance of a program; one embodiment of a multithreaded processing core 208 is described below. A processing context encompasses a complete set of state through PPU 202, while a thread may encompass only the state required to shade a single pixel. Threads run inside processing contexts: one processing context might contain thousands of running threads. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by the pushbuffer via memory bridge 105 and bus 113, interacting with local PP memory 204 (which can be used as graphics memory including, e.g., a conventional frame buffer, instruction stream buffer 224, texture maps, and the like) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to instruction stream buffer 224, and which may be located in system memory 104, PP memory 204, or another storage location accessible to both CPU 102 and PPU 202. PPU 202 reads the command stream from instruction stream buffer 224 and executes commands asynchronously with operation of CPU 102.

A compiler program executing on CPU 102 or another CPU may be used to identify programming errors, such as illegal instructions. However, runtime errors may be undetected and front end 212 may be configured to implement a default error handling and override illegal conditions so that processing units, such as cores 208 may continue processing. Cores 208 are configured to capture the unit state in unit level error status registers when a runtime error event is detected in order to provide warnings and facilitate debugging of runtime errors. The reporting of the error events as warnings may be disabled or enabled to selectively monitor each core 208. Warnings for each core 208 are propagated to an exception register in front end 212. The warnings are then aggregated and propagated to an interrupt register in front end 212 in order to selectively generate an interrupt and facilitate debugging. Front end 212 outputs enabled interrupts to host interface 206.

A debugging application, i.e., runtime debugger, may be used to query the interrupt, exception, and unit level error status registers via host interface 206 and front end 212 to determine the cause of any hardware warnings. The default error handling behavior that overrides error conditions may be advantageously used in conjunction with the hardware warning protocol to allow the processing units to continue operating.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU 202 may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs 202 in a multi-PPU system may be identical to or different from each other; for instance, different PPUs 202 might have different numbers of cores, different amounts of local PP memory, and so on. Where multiple PPUs 202 are present, they may be operated in parallel to process data at higher throughput than is possible with a single PPU 202.

Systems incorporating one or more PPUs 202 may be implemented in a variety of configurations and form factors, including desktop, laptop, or handheld personal computers, servers, workstations, game consoles, embedded systems, and the like.

Systematic Hardware Warning Protocol

Figure 3A:
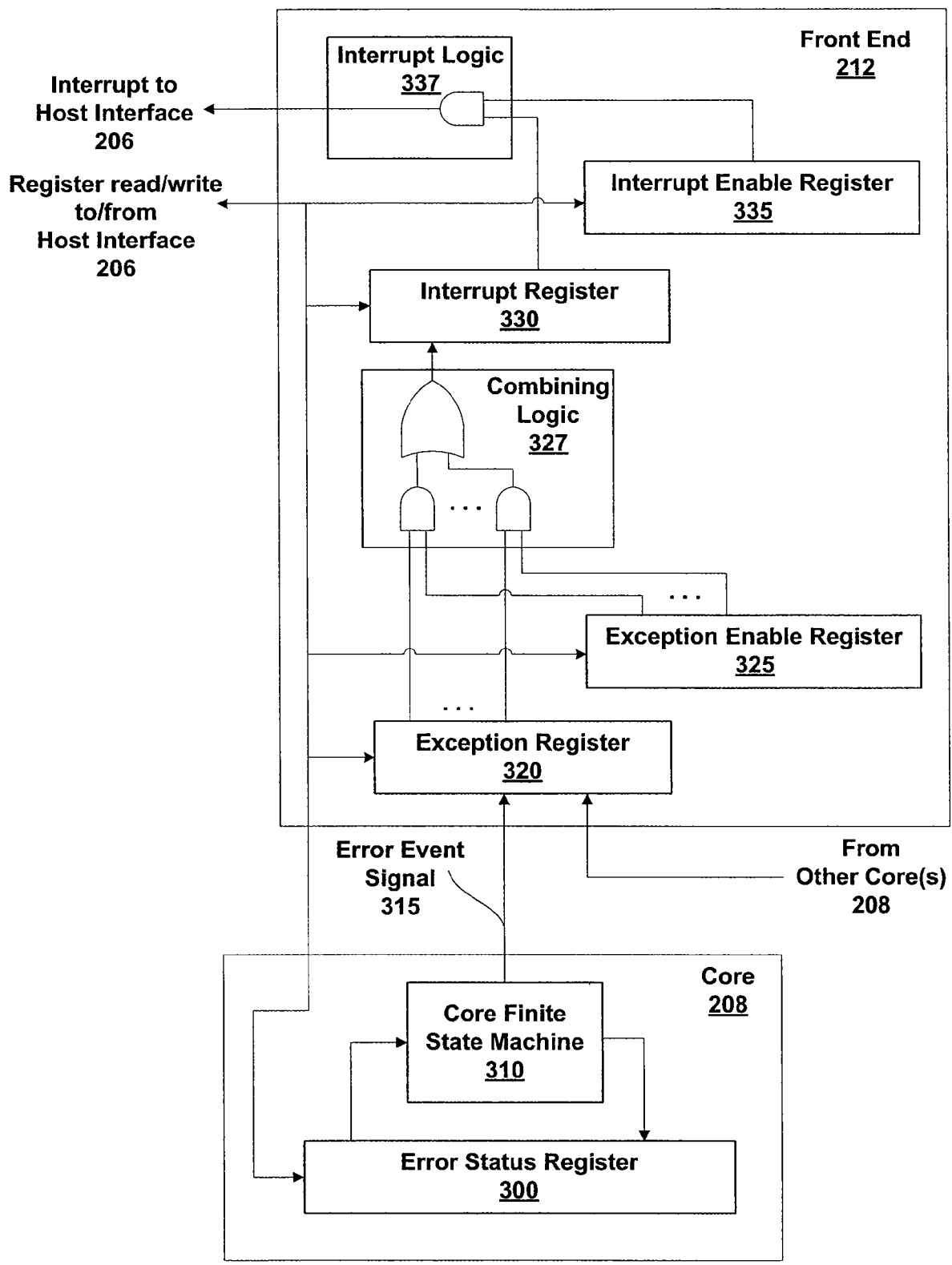
FIG. 3A is a block diagram of a portion of the parallel processing unit shown in FIG. 2, including the front end monitoring unit and a core in accordance with one or more aspects of the present invention.

FIG. 3A is a block diagram of a portion of PPU 202 shown in FIG. 2, including the front end monitoring unit, front end 212 and one of cores 208, in accordance with one or more aspects of the present invention. The hardware warning protocol provides a systematic mechanism for detecting and reporting error events during execution of a program by one or more cores 208. In some embodiments of the present invention, other units within PPU 202, including fixed function units are configured to detect and report runtime errors using this mechanism. Core 208 includes an error status register 300 and core finite state machine 310. Core 208 may also include other subunits that are configured to perform operations specified by program instructions, e.g., shifting, addition, subtraction, reciprocal, multiplication, matrix operations, and other logical and mathematical operations that are not shown in FIG. 3A. Core finite state machine 310 is configured to detect an error event for the core 208 and trigger error state register 300 to store the error state. An error state is an illegal operating state, where an operating state is defined as the data stored in registers and memory resources of core 208 and the pending instruction. An error event is an error state occurring at a particular point in time. Core 208, for any given unique error state, responds in a defined manner that is identical for each such error event to support the default error handling behavior. For example, when an illegal register operand in an instruction is detected (an error event), the instruction is treated as a NOP (no operation).

Capturing all or at least a portion of the error state in error status register 300 permits debugging of the program that caused the error at a later time, such as after an image is rendered. Since each core 208 within PPU 202 includes an error status register 300, the hardware error reporting protocol is systematic and consistent. Host interface 206 is configured to access error status register 300 to enable error status register 300 to capture error state information, read error status register 300 during debug, and reset error status register 300 to clear the error state information.

Core finite state machine 310 signals error status register 300 to capture the error state and outputs an error event signal 315 to an exception register 320 within front end 212 indicating that an error event has occurred in core 208. Error event signal 315 causes an exception bit in exception register 320 corresponding to the particular core 208 to be updated. Exception register 320 functions as a set/reset flip flop to capture an assertion of each unit level error event signal 315.

The bits of exception register 320 are set by core 208 and reset by host interface 206. Host interface 206 can read exception register 320 as needed to determine which core(s) 208 reported a hardware warning. As shown in FIG. 3A, additional error event signals 315 are provided to exception register 320 by other cores 208.

In addition to exception register 320, front end 212 includes an exception enable register 325, combining logic 327, interrupt register 330, interrupt enable register 335, and interrupt logic 337. Front end 212 may also include additional circuitry to perform functions other than the hardware warning protocol. For each bit in exception register 320 there is a corresponding bit in exception enable register 325 that is configured to enable or disable propagation of each hardware warning represented by a bit in exception register 320 to interrupt register 330 via combining logic 327. Host interface 206 may write interrupt enable register 335 to enable and disable warnings for one or more cores 208. The corresponding bits of exception register 320 are combined with the bits in exception enable register 325 as shown in combining logic 327 to produce hardware warning bits that are aggregated to produce a hardware interrupt signal. As shown in FIG. 3A, an OR gate is used to aggregate the hardware warning bits into a single hardware interrupt signal. In other embodiments of the present invention, other logic gates may be used to aggregate the hardware warning bits into one or more hardware interrupt signals.

The hardware interrupt signal is stored in interrupt register 330 which functions as a set/reset flip flop to capture an assertion of the hardware interrupt signal. The bit of interrupt register 330 is set by combining logic 327 and reset by host interface 206. Host interface 206 can read interrupt register 330 to determine if any cores 208 initiated an interrupt. For the bit in interrupt register 330 there is a corresponding bit in interrupt enable register 335 which is configured to enable or disable propagation of the hardware interrupt to host interface 206. Host interface 206 may write interrupt enable register 335 to enable and disable interrupts. The corresponding bit of interrupt register 330 is combined with the bit in interrupt enable register 335 as shown in interrupt logic 337 to produce an interrupt signal that is output to host interface 206.

Figure 3B:
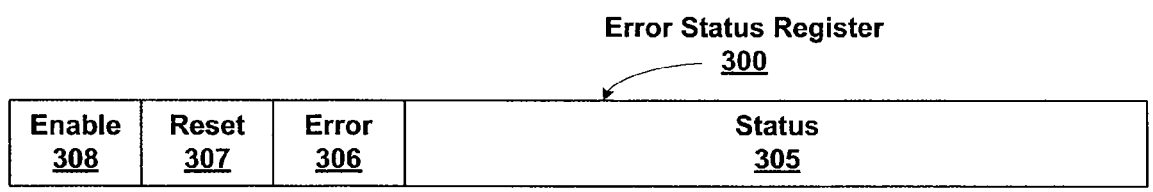
FIG. 3B is unit level error status register shown in FIG. 3A in accordance with one or more aspects of the present invention.

FIG. 3B is the unit level error status register 300 shown in FIG. 3A, in accordance with one or more aspects of the present invention. Enable 308 is a readable/writable error event reporting enable bit that can be written only by front end 212. When enable 308 is set, core 208 is allowed to report error events to front end 212. When enable 308 is cleared (reset), core 208 is required to suppress reporting of error events. In either case, in response to an error event, core 208 transitions to a well defined state according to the default error handling behavior. The default error handling behavior may allow processing to continue or may cause processing to stop. Importantly, the default error handling behavior is deterministic.

Reset 307 is a write-only bit that can be written only by host interface 206. When reset 307 is set, error 306 is reset and trapping of the error state for core 208 in status 305 is re-enabled. Error 306 is set by core finite state machine 310 when an error event occurs, reset by reset 307, and read by core finite state machine 310 to determine whether or not an error event is a first trapped error event for core 208 following an assertion of error 306. Status 305 includes one or more bits that are loaded by core finite state machine 310 when a first trapped error event occurs and read by host interface 206. In other words, status 305 functions as a "mousetrap" to trap the error state for core 208, and can represent any number of bits.

Once the trap is tripped by an error event (setting error 306) status 305 stores and holds the error status. However, core finite state machine 310 may be configured to assert error event signal 315 to front end 212 for each error event, not only the first trapped error event. Strobing reset 307 re-enables the trap to capture the error state in status 305 for a subsequent error event. The bits in status 305 are specific to core 208 and a value of all zeros may be reserved to indicate that no error event has occurred. Additional error status registers 300 may be included in core 208 to capture more error state information. Examples of error state information include address values, instruction words, and the like.

Figure 4:
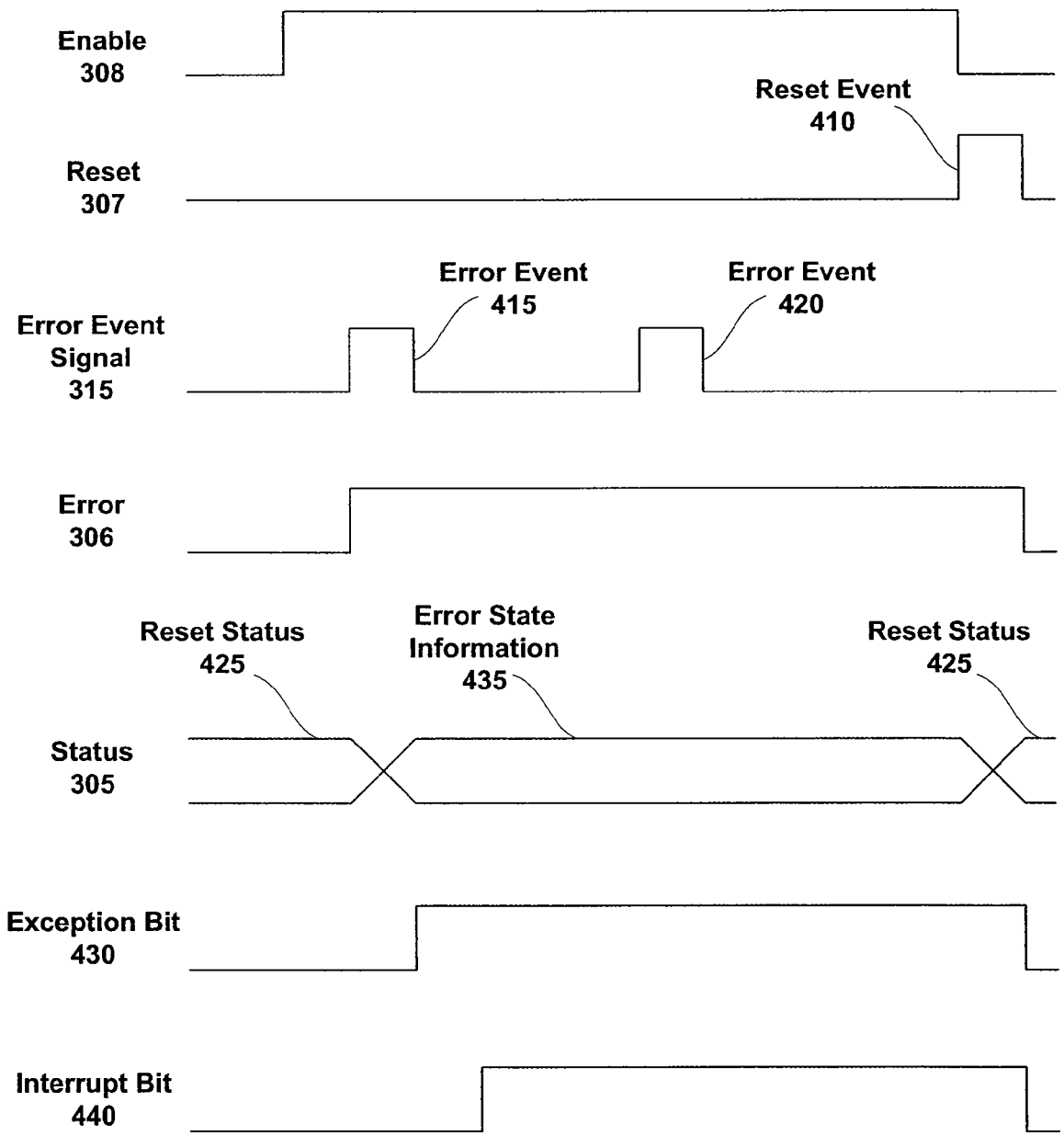
FIG. 4 is a timing diagram of the signals used for the hardware warning protocol in accordance with one or more aspects of the present invention.

FIG. 4 is a timing diagram of the signals used for the hardware warning protocol, in accordance with one or more aspects of the present invention. The signals illustrated in FIG. 4 include enable 308, reset 307, error event signal 315, error 306, and status 305. FIG. 4 also shows bits of exception register 320 and interrupt register 330, exception bit 430 (a hardware warning bit) and interrupt bit 440, respectively. Enable 308 is asserted to allow error trapping and the reporting of hardware warnings. Status 305 is a reset status 425 value, indicating that no error event has occurred since status 305 was reset. When error event signal 315 is asserted for error event 415, error 306 is set and the error state, error state information 435, is loaded into status 305. Error event 415 also results in the setting of the hardware warning bit of exception register 320 corresponding to the core 208, exception bit 430. Assuming exception bit 430 is enabled, interrupt bit 440 is also set.

A second error event, error event 420 occurs and error event signal 315 is asserted. However, status 305 is not loaded with the error state information for the second error event since reset 307 has not been asserted following the first error event, error event 415. Once set, error 306, exception bit 430, and interrupt bit 440 remain asserted until they are each reset.

Host interface 206 may read interrupt register 330, exception register 320, and error status register 300 to facilitate debug of the first error event. Following any reading by host interface 206, enable 308 may be negated. In order to re-enable trapping of error events, host interface 206 initiates reset event 410 and reset 307 is asserted. When reset 307 is asserted, status 305 changes to reset status 425 and error 306, exception bit 430, and interrupt bit 440 are cleared. In other embodiments of the present invention, status 305 maintains error state information 435 until the next trapped error event occurs. In the timing diagram of FIG. 4, error 306, exception bit 430, and interrupt bit 440 are all reset simultaneously. In other embodiments of the present invention, error 306, exception bit 430, and interrupt bit 440 may be reset during different clock cycles.

Figure 5A:
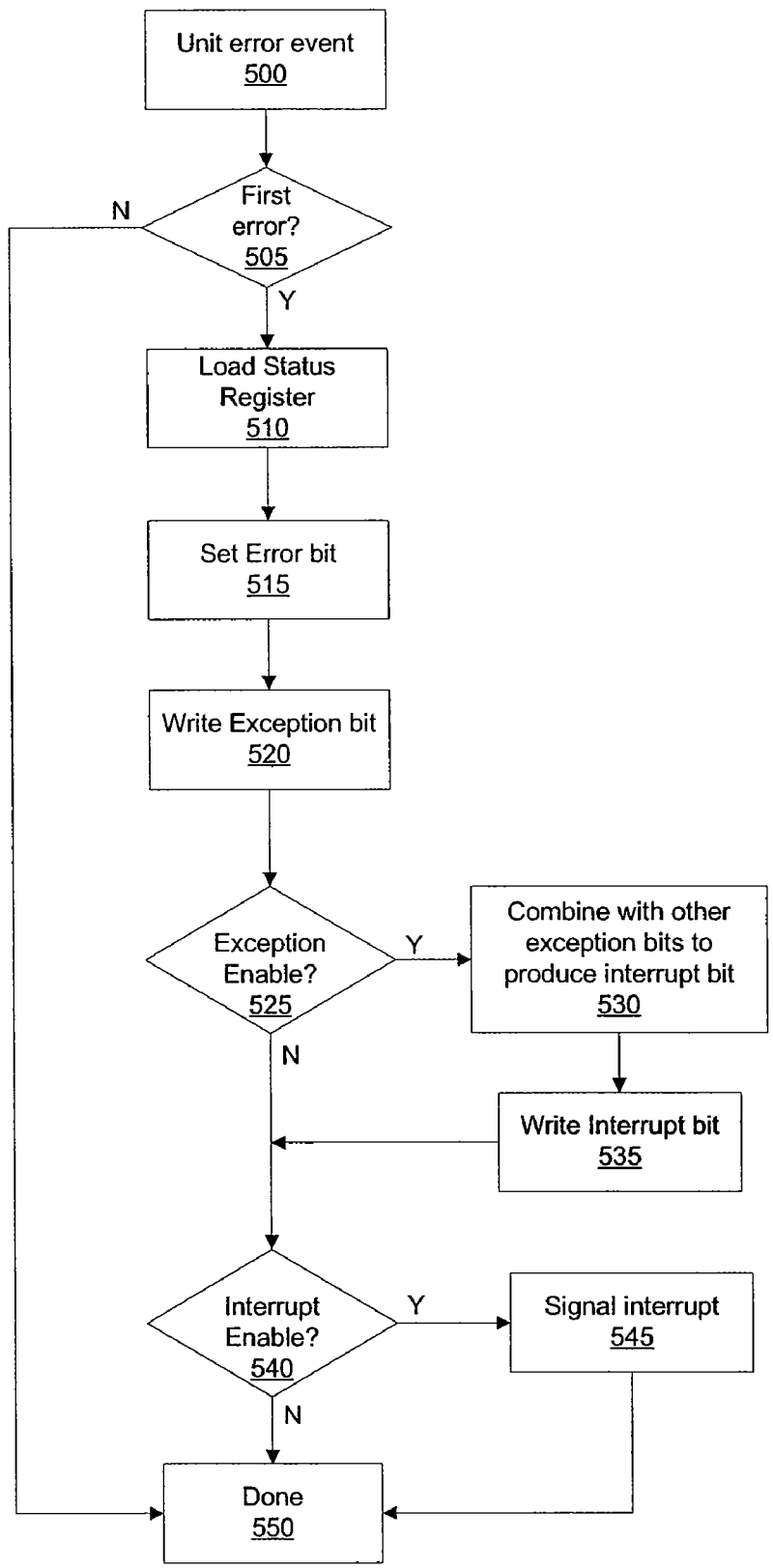
FIG. 5A is a flow diagram of method steps for the hardware error reporting protocol in accordance with one or more aspects of the present invention.

FIG. 5A is a flow diagram of method steps for the hardware error reporting protocol, in accordance with one or more aspects of the present invention. In step 500 a unit level error event is detected by core finite state machine 310. The method steps of FIG. 5A assume that enable 308 is asserted. In step 505 core finite state machine 310 determines if the error event is the first trapped error event, and, if not, then in step 550 the error event reporting is complete and status 305 within error status register 300 is not updated. Core finite state machine 310 determines that the error event is the first trapped error event when error 306 is not set. In some embodiments of the present invention, error event signal 315 may be asserted by core finite state machine 310 before completion of step 550.

If, in step 505 core finite state machine 310 determines that the error event is the first trapped error event, then in step 510 core finite state machine 310 loads status 305 with the error state information. In step 515 core finite state machine 310 sets error 306. In step 520 core finite state machine 310 asserts error event signal 315 to write a hardware warning bit in exception register 320 indicating that an error event has occurred for a core 308.

In step 525 the hardware warning bit in exception register 320 is combined with the corresponding exception enable bit of exception enable register 325, and, if the hardware warning bit is not enabled, then front end 212 proceeds directly to step 540. Otherwise, in step 530 combination logic 327 aggregates the enabled hardware warning bit with other enabled hardware warning bits of exception register 320 to produce a hardware interrupt signal. In step 535 a hardware interrupt bit of interrupt register 330 is written using the hardware interrupt signal.

In step 540 the hardware interrupt is combined with the corresponding interrupt enable bit of interrupt enable register 335, and, if the interrupt enable bit is not enabled, then front end 212 proceeds directly to step 550 and the hardware error reporting is complete. Otherwise, in step 545 the enabled hardware interrupt is output to host interface 206 to signal that an error event has occurred in at least one processing unit.

Figure 5B:
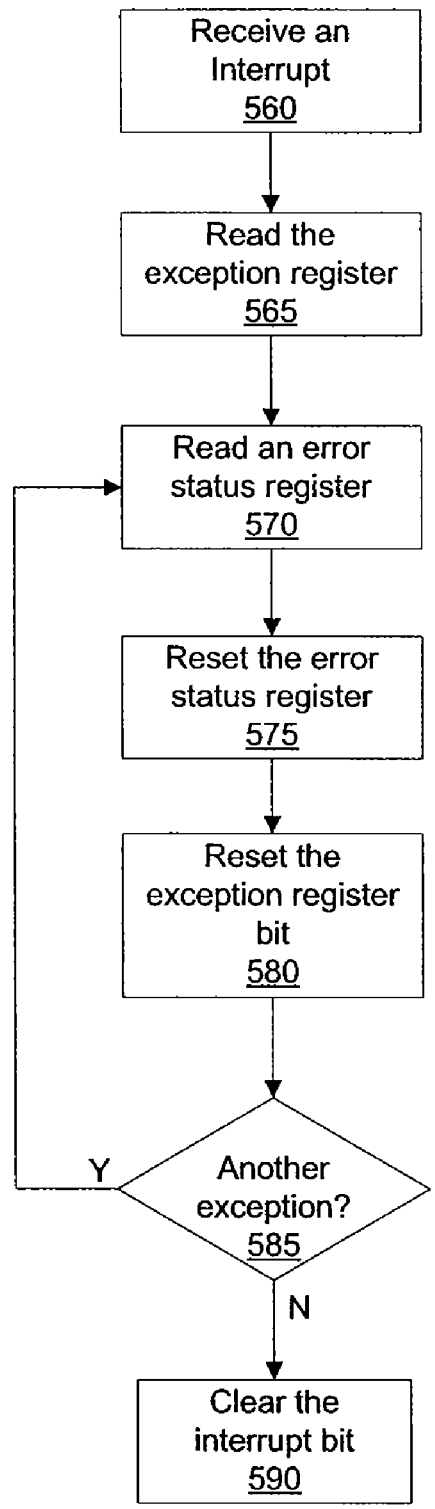
FIG. 5B is a flow diagram of method steps for the error debugging in accordance with one or more aspects of the present invention.

FIG. 5B is a flow diagram of method steps for the hardware error debugging, in accordance with one or more aspects of the present invention. In step 560 host interface 206 receives an interrupt signal from front end 212, indicating that a hardware error event has occurred. In step 565 driver software executing on CPU 102, such as device driver 101, reads (via host interface 206) exception register 320 to determine which processing unit(s), e.g. core(s) 208 have asserted a hardware warning bit. In step 570 the driver software reads an error status register 300 corresponding to a hardware warning bit that is asserted to obtain the error state information for that core 208. In step 575 the driver software resets the error status register 575 via host interface 206 by writing reset 307 to re-enable error trapping for the core 208. In step 580 host interface 206 resets the hardware warning bit in exception register 320 that corresponds to the core 208. In step 585 the driver software determines if another hardware warning bit in exception register 320 is set, indicating that an additional core 208 reported an error event.

If another hardware warning bit is not asserted, then the driver software has obtained all of the error state information and it proceeds to step 590 and clears the interrupt bit in interrupt register 330. Otherwise, steps 570, 575, and 580 are repeated for the additional core 208. In this manner, the driver software is able to systematically obtain error state information for each first trapped error event for a processing unit. This error state information may then be used to diagnose and debug the runtime error event(s) while allowing the default error handing behavior to function during execution of the program.

Figure 6:
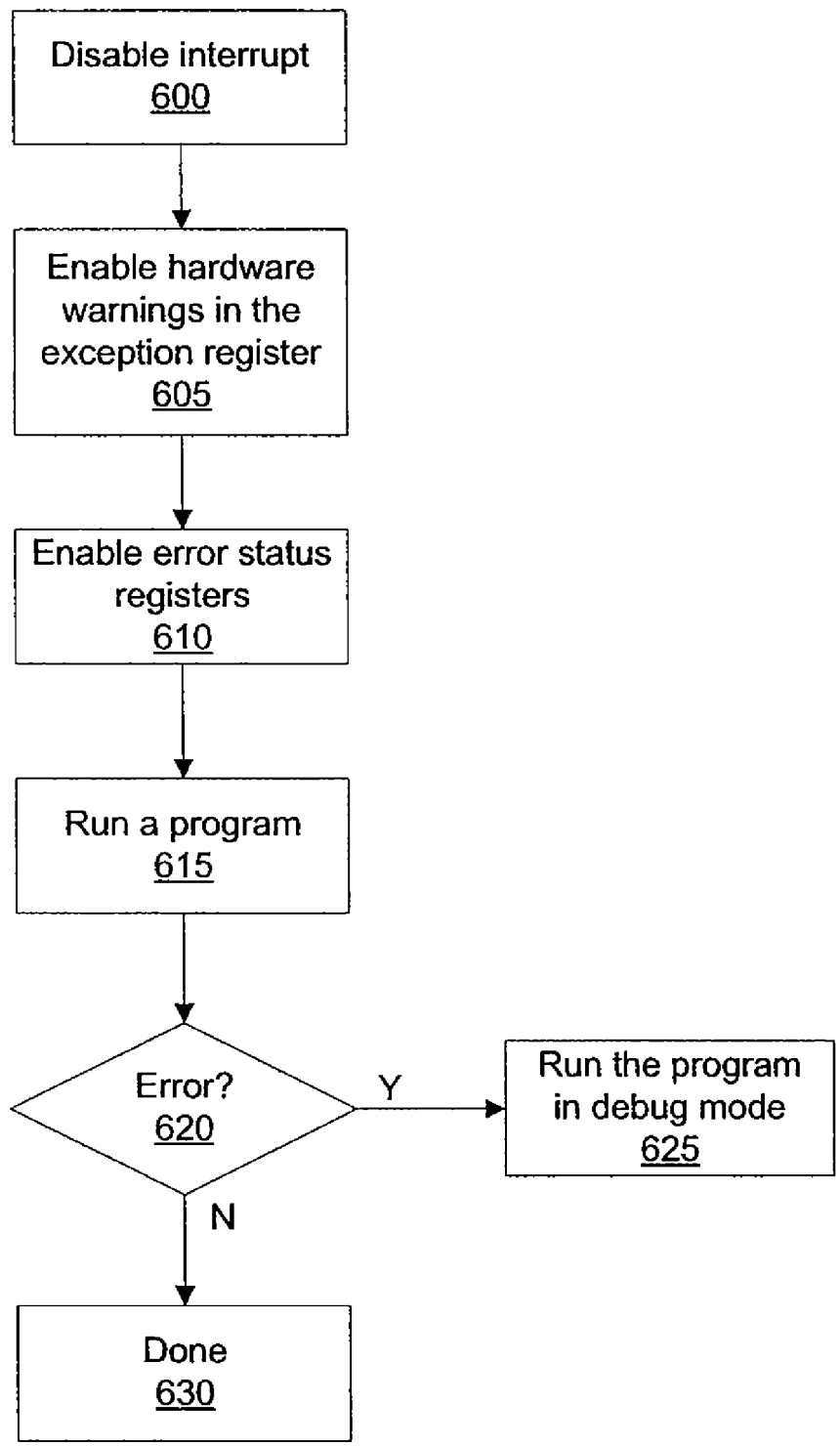
FIG. 6 is a flow diagram of method steps for using the hardware error reporting protocol to debug runtime errors in accordance with one or more aspects of the present invention.

FIG. 6 is a flow diagram of method steps for using the hardware error reporting protocol to debug runtime errors, in accordance with one or more aspects of the present invention. In step 600 the driver software disables interrupts by writing interrupt enable register 335 via host interface 206. In step 605 the driver software enables reporting of one or more hardware warnings by writing exception register 320 via host interface 206. In step 610 the driver software enables one or more error status registers 300 by setting enable 308 via host interface 206. In step 615 an application runs a program that is executed by one or more cores 208. During execution of the program first trapped error events for any of cores 208 are captured in error status registers 300 and exception register 320. Although interrupts are disabled, the hardware interrupt signal is asserted if one or more cores 208 experience an error event and a hardware interrupt bit is written in interrupt register 330.

In step 620 the driver software reads interrupt register 330 to determine if a hardware warning was been reported during execution of the program, and, if so, in step 625 the program may be run again in a debug mode. Additionally, the driver software may obtain the error state information, as described in conjunction with FIG. 5B. If, in step 620, the driver software determines that a hardware warning was not reported during execution of the program, then in step 630 the program debug is complete.

The hardware warning protocol allows for error event state information to be captured and retained for use in debugging runtime programming errors while allowing for the default error handling to be used. The default error handling behavior advantageously overrides error conditions to allow the processing units to continue operating. Individual processing units may be enabled or disabled for reporting hardware warnings and interrupts may also be disabled or enabled. Therefore, bogus warnings may be ignored while other warnings are detected and diagnosed.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for indicating warnings for a processing unit within a system, comprising:
   receiving an error event signal indicating that a programming error has been detected by the processing unit;
   capturing error state information of the processing unit in an error status register, wherein the capturing is triggered by the error event signal;
   updating an error bit to be asserted in the error status register that indicates an error event has occurred, wherein the error bit remains asserted until a reset signal is received;
   transmitting an error event signal to a monitoring unit to update an exception bit in an exception register included in the monitoring unit to indicate a hardware warning that the error event has been detected by the processing unit;
   receiving a second error event signal indicating that a second programming error has been detected by the processing unit while the error bit remains asserted; and
   transmitting a second error event signal to the monitoring unit while the error bit remains asserted.

2. The method of claim 1, further comprising a step of updating an interrupt bit corresponding to the processing unit in an interrupt register when the hardware warning is enabled for the processing unit.

3. The method of claim 2, further comprising a step of asserting an interrupt signal to a host processor of the system when an interrupt corresponding to the interrupt bit is enabled.

4. The method of claim 2, wherein updating the interrupt bit comprises aggregating with a logical OR the exception bit of the exception register with another exception bit that corresponds to a different processing unit.

5. The method of claim 1, wherein the system includes the processing unit and additional processing units, and further comprising the step of reading the exception register to determine whether one or more of the additional processing units is indicating one or more additional hardware warnings that an error event has occurred.

6. The method of claim 5, further comprising steps of:
determining that one of the additional processing units is indicating a second hardware warning;
reading an additional error status register within one of the additional processing units to obtain second error state information;
resetting the additional error status register to clear the second error state information and an additional error bit, indicating that the second hardware warning has been removed; and
resetting an additional exception bit in the exception register corresponding to the additional processing unit to indicate that the second hardware warning has been removed.

7. The method of claim 1, further comprising a step of reading the error status register within the processing unit to obtain the error state information.

8. The method of claim 1, further comprising a step of resetting the error status register to clear the error state information and the error bit, indicating that the hardware warning has been removed.

9. The method of claim 1, further comprising a step of resetting the exception bit in the exception register corresponding to the processing unit to indicate that the hardware warning has been removed.

10. The method of claim 1, further comprising a step of determining that the error event is a first trapped error event detected by the processing unit since the error status register has been reset.

11. The method of claim 1, further comprising a step of configuring the system to operate in a debug mode.

12. The method of claim 1, wherein the processing unit is configured to override the programming error and continue processing data.

13. A computing device configured to execute programs, the computing device comprising:
a monitoring unit including an interrupt register and an exception register; and
a processing unit coupled to the monitoring unit and configured to:
receive an error event signal indicating that a programming error has been detected by the processing unit;
capture error state information of the processing unit in an error status register, wherein the capturing is triggered by the error event signal;
update an error bit to be asserted in the error status register that indicates an error event has occurred, wherein the error bit remains asserted until a reset signal is received;
transmit an error event signal to the monitoring unit to update an exception bit in the exception register included in the monitoring unit to indicate a hardware warning that the error event has been detected by the processing unit;
receive a second error event signal indicating that a second programming error has been detected by the processing unit while the error bit remains asserted; and
transmit a second error event signal to the monitoring unit while the error bit remains asserted.

14. The system of claim 13, wherein the processing unit is further configured to determine that the error event is a first trapped error event detected by the processing unit since the error status register has been reset.

15. The system of claim 13, wherein the monitoring unit is configured to update an interrupt bit corresponding to the processing unit in the interrupt register when the hardware warning is enabled for the processing unit.

16. The system of claim 15, wherein the monitoring unit is further configured to assert an interrupt signal to a host processor of the system when an interrupt corresponding to the interrupt bit is enabled.

17. The system of claim 15, further comprising additional processing units, wherein the monitoring unit is further configured to aggregate the exception bit of the exception register with additional exception bits that correspond to the additional processing units to update the interrupt bit.

18. The system of claim 17, further comprising a host interface that is coupled to the monitoring unit, the processing unit, and each of the additional processing units, wherein the host interface is configured to read the exception register to determine whether one or more of the additional processing units is indicating one or more additional hardware warnings that an error event has occurred.

19. The system of claim 13, further comprising a host interface that is coupled to the monitoring unit and the processing unit and configured to read the error status register within the processing unit to obtain the error state information and reset the error status register to clear the error state information and the error bit, indicating that the hardware warning has been removed.

20. The system of claim 13, wherein the processing unit is further configured to concurrently process data for multiple threads.

* * * * *